US006329066B1

(12) United States Patent
Baur et al.

(10) Patent No.: US 6,329,066 B1
(45) Date of Patent: Dec. 11, 2001

(54) SELF-COMPENSATING SPIRAL FOR A SPIRAL BALANCE-WHEEL IN WATCHWORK AND PROCESS FOR TREATING THIS SPIRAL

(75) Inventors: Jacques Baur, Aubonne (CH); Patrick Sol, Chanay (FR)

(73) Assignee: Montres Rolex S.A., Geneva (CH)

( * ) Notice: Subject to any disclaimer, the term of this patent is extended or adjusted under 35 U.S.C. 154(b) by 0 days.

(21) Appl. No.: 09/535,294

(22) Filed: Mar. 24, 2000

(51) Int. Cl.[7] .................................. B32B 9/00; G04F 5/00

(52) U.S. Cl. ........................ 428/472.1; 428/457; 428/689; 368/161; 368/168

(58) Field of Search .................................. 428/457, 472.1, 428/689, 702; 368/161, 168; 267/166

(56) References Cited

U.S. PATENT DOCUMENTS 3,547,713 * 12/1970 Steinemann et al. ............... 148/11.5
4,765,335 8/1988 Schmidt et al. .
5,881,026 * 3/1999 Baur et al. ........................... 368/169

FOREIGN PATENT DOCUMENTS 340 777 A 8/1959 (CH) .
15 081/66 A4 10/1966 (CH) .
0 886 195 A 12/1998 (EP) .
886195-A1 * 12/1998 (EP) .............................. G04B/17/22

* cited by examiner

*Primary Examiner*—Deborah Jones
*Assistant Examiner*—Gwendolyn Blackwell-Rudasill
(74) *Attorney, Agent, or Firm*—Henderson & Sturm LLP

(57) ABSTRACT

This self-compensating spiral for a mechanical spiral balance-wheel oscillator in watchwork or other precision instrument, made of a paramagnetic alloy, contains at least one of the elements Nb, V, Ta, Ti, zr, Hf and is covered with a substantially uniform oxide layer having a thickness greater than or equal to 20 nm, formed by subjecting the said spiral to an anodizing treatment.

4 Claims, 2 Drawing Sheets

SELF-COMPENSATING SPIRAL FOR A SPIRAL BALANCE-WHEEL IN WATCHWORK AND PROCESS FOR TREATING THIS SPIRAL

Cross-Reference to Related Applications

Not Applicable.

STATEMENT REGARDING FEDERALLY SPONSORED RESEARCH OR DEVELOPMENT

Not Applicable.

Background of the Invention:

1. Field of the Invention

The present invention relates to a self-compensating spiral for a mechanical spiral balance-wheel oscillator in watchwork or other precision instrument, made of a paramagnetic alloy containing at least one of the elements Nb, V, Ta, Ti, Zr, Hf, as well as to a process for treating this spiral.

2. Description of the Prior Art

The existence of drift phenomena in the frequency of a spiral balance-wheel oscillator as a function of time is well known to watchmakers. Thus such an oscillator fitted with an as-manufactured spiral made of a ferromagnetic alloy will gradually see its frequency increase, resulting after one year in a variation in rate of the order of 10 s/day.

This is essentially explained by the fact that the manufacturing operations create perturbations in the crystalline structure of the spiral. For example, the plastic deformations resulting from wire drawing, from rolling or from forming the Breguet curve create defects in the crystal, such as vacancies, interstitials or dislocations. Excessively rapid cooling steps after heat treatment trap vacancies. Internal stresses are also generated by the plastic deformations or the sudden variations in temperature. Oxygen can diffuse into the crystal during heat treatments.

All these perturbations of the crystalline structure result in anelastic phenomena which slightly modify the Young's modulus of the spiral. Usually, the anelastic phenomena result in a modulus lower than the purely elastic modulus.

Over the course of time, the defects created in the crystalline structure will migrate at room temperature by slow diffusion toward equilibrium positions that are more stable and the internal stresses will relax. These structure reorganization mechanisms will thus cause the anelastic phenomena which were perturbing the Young's modulus slowly to disappear. In general, an increase in the modulus, tending toward its purely elastic value, is observed.

The relative variations due to the anelastic phenomena and to their disappearance are extremely small, of the order of $10^{-4}$, but nevertheless clearly measurable on the rate of a watch since a relative variation in the modulus of $2.3 \times 10^{-5}$ corresponds to a variation in rate of 1 s/day.

In order to reduce this drift, it is common practice to carry out heat treatments, called oven treatments, which consist in heating the completed spirals at a moderate temperature, of between 100 and 250° C., for a period of 6 to 24 h. These treatments make it possible to reduce the rate drift over the first few years to below 1 s/day, this being acceptable given the other perturbations caused by wearing the watch, such as knocks. The oven treatment has the effect of accelerating, by thermal activation, the process of stress relaxation and of diffusion of the defects toward their equilibrium positions.

The same drift phenomenon is found in the case of spirals made of paramagnetic alloys, especially Nb—Zr, albeit even more accentuated, as illustrated by the diagram in FIG. 1. Unlike what happens in the case of the spirals made of ferromagnetic alloys, in the case of such a spiral made of a paramagnetic alloy the same type of oven treatment does not allow the rate drift to be reduced to below approximately 5 s/day after one year, as the diagram in FIG. 2 shows, in which curve a) corresponds to a spiral treated at 170° C. and curve b) to a spiral treated at 270° C.

The impossibility of reducing to within acceptable limits, or even eliminating, the residual rate drift of spiral balance-wheel oscillators fitted with spirals made of a paramagnetic alloy, especially Nb—Zr, may lead one to believe that other mechanisms are modifying the torque exerted by the spiral, in addition to those described above in the case of the spirals made of ferromagnetic alloys.

Paramagnetic alloys have a very great affinity for oxygen. In the ambient air, a surface oxide film is formed, which passivates the alloy. The presence of this film, despite its small thickness of a few nm, perturbs the torque exerted by the spiral. This is because the thickness of the spiral is approximately 30 to 50 $\mu$m and the relative variations in torque which perturb the rate of the oscillator are of the order of $10^{-4}$, i.e. the order of magnitude of the ratio of the thickness of the oxide film to the thickness of the spiral. These considerations suggest that, on the one hand, rate drifts observed with spirals made of Nb—Zr are due to the modification of the oxide film in the ambient air over time, thereby explaining the reason why the conventional oven treatment by itself is unable to solve this drift problem, as it can do in the case of spirals made of ferromagnetic alloys.

BRIEF SUMMARY OF THE INVENTION

Thus, it is possible to deduce from these considerations that the rate drift of a spiral balance-wheel fitted with a spiral made of a paramagnetic alloy, especially an Nb—Zr alloy, is due to the sum of two effects:

a) a volume effect created by the slow reorganization of the microstructure at room temperature. This effect is similar to that observed in the case of ferromagnetic spirals and can be eliminated by oven treatment;

b) a surface effect created by the oxidation and passivation of the surface layer in contact with the air.

The object of the present invention is to reduce, or even eliminate, the rate drift due to the abovementioned effect b).

For this purpose, the subject of this invention is a self-compensating spiral for a mechanical spiral balance-wheel oscillator in watchwork or other precision instrument, according to claim 1. The subject of this invention is also a process for treating this spiral according to claim 4.

The growth of an oxide layer on the surface of the spiral also serves to passivate it so that it will no longer experience a drift in its torque over time, due to the slow formation of the oxide layer in the open air, as occurs otherwise. The advantage of the anodizing process for forming this oxide layer is that it can be carried out at low temperature, without interfering with the crystalline structure of the spiral. In addition, this anodizing treatment allows the thickness of the oxide layer to be adjusted very simply, completely safely and perfectly reproducibly, to the desired value. Furthermore, the thickness of this layer, and therefore the color of the spiral thus obtained, is perfectly uniform.

BRIEF DESCRIPTION OF THE SEVERAL VIEWS OF THE DRAWINGS

Further advantages of the present invention will appear in the light of the description and the appended explanatory diagrams, these relating to one embodiment of the invention, given by way of example.

DETAILED DESCRIPTION OF THE INVENTION

According to one method of carrying out the process forming the subject of the present invention, a dilute sulfuric acid solution containing 0.1 vol % in water is prepared. The spiral is immersed in this solution while passing a low-intensity current at a voltage of 30 V for 30 s. The low-intensity current makes it possible for the spiral not to be heated appreciably during the anodizing treatment so as not to modify the thermal coefficient of the Young's modulus (TCE). Under these conditions, the oxide layer which forms has a thickness of the order of 50 nm, giving the spiral a blue color. This spiral is then treated in an oven for 6 h at 200° C. in a nitrogen atmosphere. To vary the color, it is merely a question of modifying the anodizing voltage. A given voltage corresponds to a defined color. The cessation of the anodizing process depends on the thickness of the layer, which itself depends on the breakdown voltage of this oxide layer. This explains the fact that the thickness of the layer and therefore its color are perfectly controllable and reproducible. In addition, the color is uniform over the entire surface of the spiral.

Figure 1:
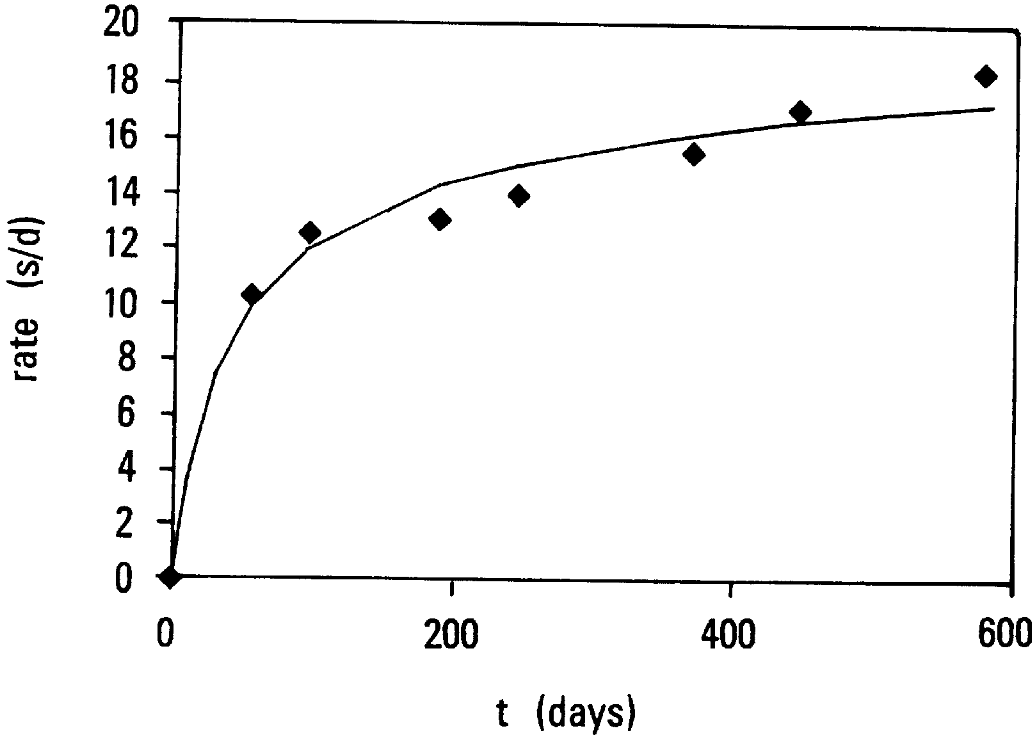
FIG. 1 is a diagram showing the variation in daily drift in s/day as a function of time t in days of a watch whose spiral balance-wheel is fitted with an 18% Nb—Zr spiral, as manufactured.
Figure 2:
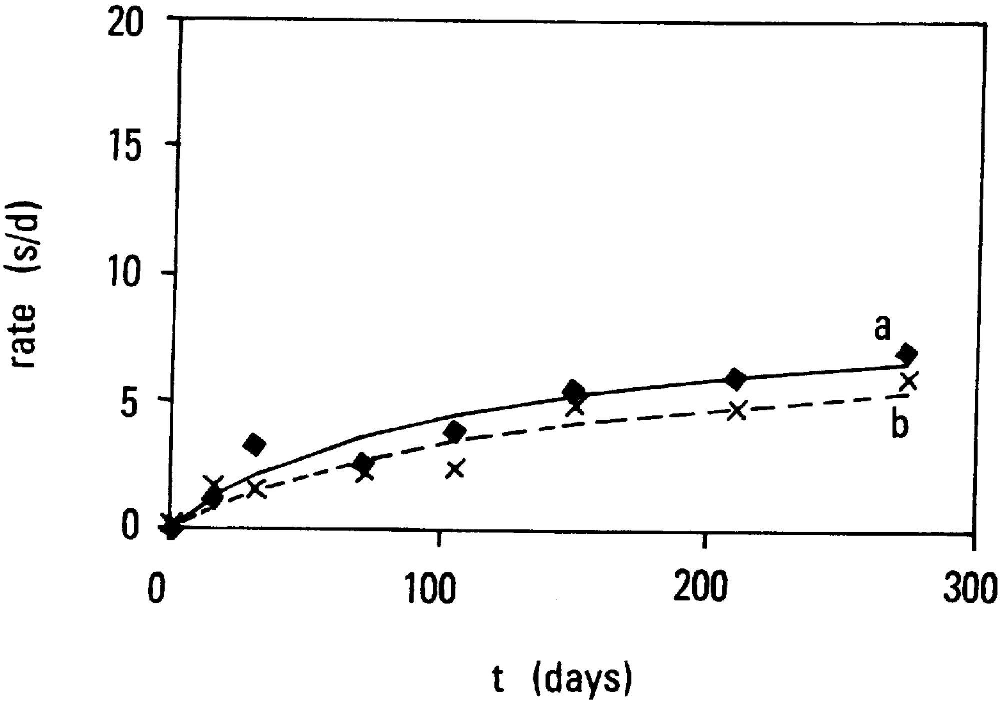
FIG. 2 is a diagram similar to that in FIG. 1 for a watch whose spiral balance-wheel is fitted with an 18% Nb—Zr spiral oven-treated in nitrogen for 24 h.
Figure 3:
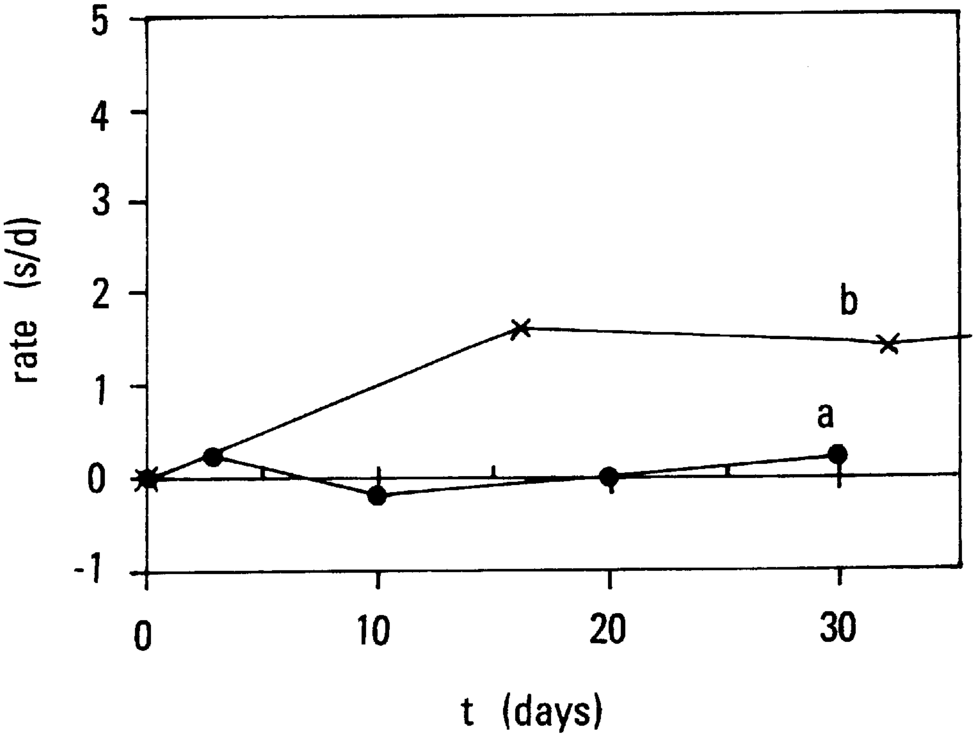
FIG. 3 is the same diagram relating to two watches fitted a) with an 18% Nb—Zr spiral according to the invention and oven-treated b) with the same spiral which was only oven-treated.

Curve a) in FIG. 3 shows that the daily drift of a watch fitted with this spiral is virtually 0, unlike in curve b) relating to the spiral that has undergone only an oven heat treatment.

The thickness of the oxide layer is not of importance in achieving the objective of the present invention, so that it is possible to choose this thickness according to the color desired. Thus, under the abovementioned anodizing conditions, a yellow color is obtained by applying a voltage of 15 V to the spiral and a red color is obtained with a voltage of 18 V. In general, the thickness of the colored layer is between 20 and 200 nm.

It is necessary however to take into account the fact that the formation of a 20 to 200 nm oxide layer already reduces the apparent TCE of the spiral by approximately 5 ppm/°C. and increases the torque. It is therefore necessary to take account of these differences during the heat treatment prior to fixing the shape, so as to obtain the desired TCE and the desired torque after the anodizing oxidation treatment.

The rate drift resulting from the slow oxidation of the Nb—Zr spiral in the ambient air is a very general phenomenon for all Nb alloys or those containing large proportions of Nb, particularly when the main alloying elements are also highly reactive to oxygen, such as Ti, V, Zr, Cr, Ta, Mo, Hf.

Even more generally, it is known from CH 551,032 that paramagnetic alloys based on Nb, Ta, V are liable to have a positive TCE. These elements are highly reactive to oxygen and also liable to create a drift in the torque of the spiral by oxidation of the surface in the ambient air.

DE 1,558,816 also cites alloys based on at least one element from the group Nb, V, Ta and an element from the group Ti, Zr, Hf as liable to have a positive TCE. All the alloys of this type are also highly reactive to oxygen and will create a drift in the torque of the spiral by oxidation in the ambient air, so that they may all be coated with an oxide layer in accordance with the subject of the present invention.

Thermal oxidation would be another possible way, although less favorable than anodizing, since it involves a heat treatment at a relatively high temperature. Typically, a layer with a blue color is obtained by a 2 to 3 minute treatment at 450° C. in air. This temperature is high enough to allow oxygen to diffuse into the volume of the spiral so that the TCE will be perturbed in addition to the effect due to the oxide layer. Thus, the reproducibility of this type of treatment is more random than anodizing.

What is claimed is:

1. Self-compensating spiral for a mechanical spiral balance-wheel oscillator in watchwork or other precision instrument, made of a paramagnetic alloy containing at least one of the elements Nb, V. Ta, Ti, Zr, Hf, and being covered with a substantially uniform oxide layer having a thickness greater than or equal to 20 nm.

2. The spiral according claim 1, wherein the thickness of said oxide layer is capable of coloring it.

3. The spiral according to claim 1, wherein it is made of an Nb—Zr alloy containing between 5% and 25% Zr.

4. The spiral according to claim 2, wherein it is made of an Nb—Zr alloy containing between 5% and 25% Zr.

* * * * *